UNITED STATES PATENT OFFICE.

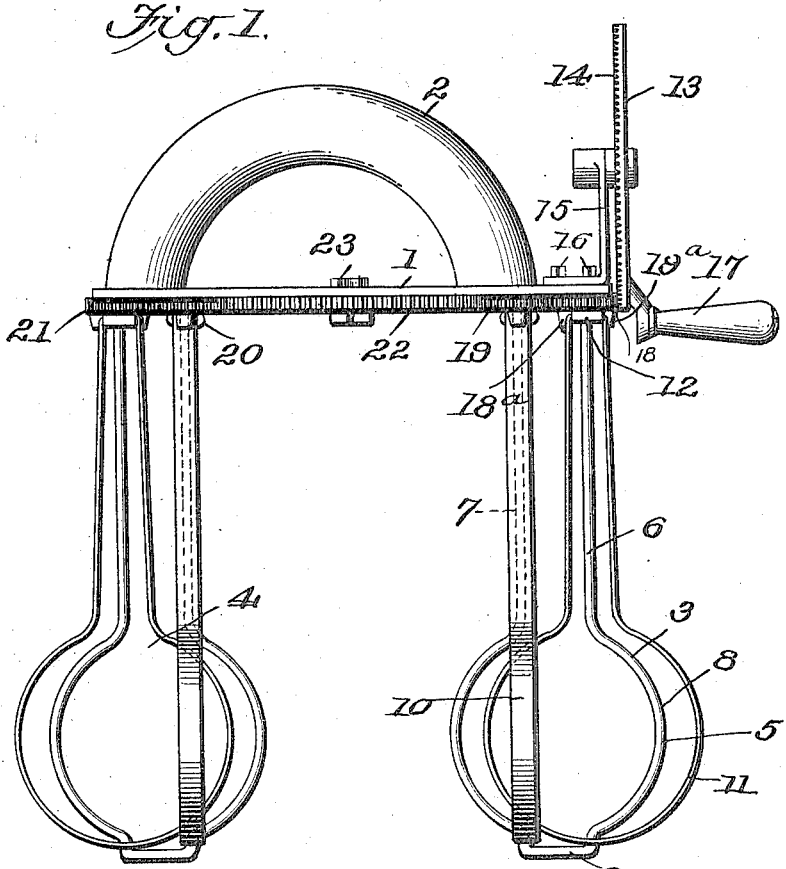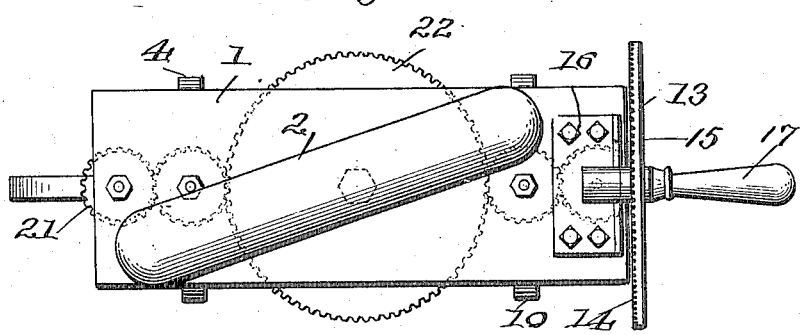

NICHOLAS CONDOGEORGE, OF SEATTLE, WASHINGTON.

EGG-BEATER.

1,184,927.　　　　Specification of Letters Patent.　　Patented May 30, 1916.

Application filed June 27, 1914.　Serial No. 847,623.

*To all whom it may concern:*

Be it known that I, NICHOLAS CONDOGEORGE, a subject of the King of Greece, residing at Seattle, in the county of King and State of Washington, have invented certain new and useful Improvements in Egg-Beaters; and I do hereby declare the following to be a full, clear, and exact description of the invention, such as will enable others skilled in the art to which it appertains to make and use the same.

My invention relates to improvements in egg beaters, or mixers and the primary object thereof resides in the provision of a simple, inexpensive and effective beater of the character described that is arranged to operate in separate receptacles and to be held by the left hand and turned by the right; thus the whites and yolks of eggs may be stirred or beaten simultaneously and a great deal of time saved.

Another object is to provide an egg beater of the character described that will be of great service in hotels and restaurant kitchens inasmuch as two receptacles or bowls of eggs or material to be beaten may be operated upon simultaneously and with ease thus saving a great deal of time.

Another and more specific object is to provide a novel arrangement of gears in combination with a body plate that serve to rotate two sets of beater members in an easy and reliable manner.

Another object is to provide a beater of the character described that is of simple construction and may be quickly assembled and disassembled and which is inexpensive to manufacture.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts. Figure 1 is a front elevation of my improved egg beater. Fig. 2 is a top plan view.

Referring to the drawings by characters of reference, the numeral 1 designates as an entirety a rectangular and preferably metallic body plate. An approximately U-shaped handle 2 is suitably secured at its ends to the upper face of the body plate 1 and arranged diagonally relative to the longitudinal axis plate for a purpose to be later more fully described. Extending downwardly at right angles to the plate 1 in a vertical plane and carried at the ends of the plate in spaced relation to one another are beater elements designated 3 and 4 as entireties. These elements 3 and 4 are so spaced as to be able to be positioned in bowls or receptacles so that the whites and yolks of eggs may be beaten simultaneously or other material to be beaten operated upon.

Each of the beater elements consists of a stationary beater member 5 that consists of spaced rods 6 and 7 arranged parallel to one another, and secured at their upper ends to the body plate 1 on the under face thereof. These rods 6 and 7 are bowed to their lower ends to provide semi-circular portions 8 that are opposed and provide an approximately circular ring. A connecting portion 9 is formed integral with the lower ends of the bowed or semi-circular portions 8. Mounted on the lower portions of the semi-circular portions 8 of the frame 5 are rotary beater members 10 and 11 that are preferably formed of some flat or ribbon metal and bent into a shape similar to the frame 5. The upper ends of the members 10 and 11 are secured by clips 12 at the upper ends of the rods 6 and 7. The members 10 and 11 are arranged to revolve in opposite directions to coöperate with the semi-circular portions 8 and provide a thorough beating action. The lower end portions of the members 10 and 11 have inserted therethrough the lower ends of the arcuate portions 8 so that the members 10 and 11 are rotatably supported at their lower ends.

As a means for rotating the members 10 and 11 of the beater elements 3 and 4 I provide a vertically disposed gear wheel 13 having facial teeth 14, that is mounted for rotation upon an upstanding bearing 15 secured by a suitable and preferably removable fastening member 16 to one end of the base plate 1 on the upper side thereof. An operating handle 17 is connected with the gear 13.

The lower edge of the gear 13 extends to a point below the body plate 1 at the end thereof and meshes with a gear 18 rotatably mounted upon the upper end of the rod 6 and provided with downwardly extended projections 18[a] to engage upon opposite sides of the upper end portion of the member 11 so that said member is rotated with the gear. This gear 18 meshes with a similar gear 19 mounted in an identical manner upon the upper end of the rod 7 and secured similarly to the upper end portion of the member 10. It will be readily seen that when the gear 13 is rotated the members 10 and 11 will be rotated about the frame 5 therefor or stationary beater member in opposite directions. The element 4 is provided with meshing gear wheels 20 and 21 that are similar to the ones 18 and 19 and arranged at the other end of the plate 1. A relatively large gear wheel 22 rotatably secured by suitable fastening or securing elements 23 to the under face of the plate 1 centrally thereof meshes on opposite sides with the gears 19 and 20 as clearly shown in Fig. 1. This gear wheel 22 is approximately the same size as that of the gear 13; thus two elements 3 and 4 are rotated with approximately the same speed. The gear 22 engages flat upon the under face of the plate 1. The handle 2 is arranged diagonally so that the gearing 13 and corresponding and coöperating parts may be positioned at one end of the plate without interference by the handle.

In operation, assuming that two bowls containing the whites and yolks of eggs to be beaten are arranged in close proximity to one another upon a table, the operator by grasping the handle 2 and holding the elements 3 and 4 within the bowls may quickly beat the material within the bowls in an extremely reliable and expeditious manner. By rotating the gear 13 the members 10 and 11 of the beating elements 3 and 4 are rotated in opposite directions and a thorough beating action provided.

It will be readily seen that I have provided a simple, effective and reliable egg beater that will prove of great service in hotel and similar kitchens where preparations are beaten in a hurried manner and the saving of time an important object.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

A device of the class set forth comprising a substantially oblong supporting plate having a handle arranged diagonally on its upper face, stationary beating elements rigidly secured to and depending from the under face of said plate adjacent each of its ends, gears arranged in pairs secured to the under side of the face of said plate at each end, each pair of said gears meshing with one another, a large gear secured centrally to the under side of said plate and meshing with one gear of each pair, rotary beating elements secured to each pair of said gears and arranged on said stationary beating elements, a vertical bearing bracket secured to the upper face of said plate at one end thereof, a gear journaled in said bracket and located below the surface of said plate, said gear meshing with one gear of one of the pairs arranged on the under side of said plate, means for rotating said last named gear for rotating the rotary beating elements.

In testimony whereof I affix my signature in presence of two witnesses.

NICHOLAS CONDOGEORGE.

Witnesses:
JOSEPH HARKINS,
GLENN C. BEECHLER.

Copies of this patent may be obtained for five cents each, by addressing the "Commissioner of Patents, Washington, D. C."